United States Patent Office 3,449,124
Patented June 10, 1969

3,449,124
MEAT EMULSION AND METHOD OF PREPARING SAME
Stuart Lipner, Jersey City, N.J., assignor, by mesne assignments, to Isolated Beef Protein Supplements, Inc., New York, N.Y., a corporation of New York
No Drawing. Filed Nov. 13, 1964, Ser. No. 411,132
Int. Cl. A23j 1/06
U.S. Cl. 99—108                    5 Claims

ABSTRACT OF THE DISCLOSURE

Bovine protein concentrate comprising the dried plasma component of bovine blood having therein an amount of the order of 0.1%±0.02% based on the weight of the blood of the compound disodium ethylenediamine tetraacetic acid as the sole anticoagulant for said blood. A meat emulsion containing 1 to 4 ounces per 100 pounds of meat of the above protein concentrate is also described as is a method for its detection in the meat emulsion.

---

The present invention relates to bovine protein concentrate used as a binder in meat emulsions under circumstances which reasonably permit the use of excessive proportions to be detected and, consequently, prevented. The invention relies upon the provision of specifically new bovine protein concentrate and includes spice mixtures, flavoring agents and meat emulsions containing the concentrate.

The term "bovine protein concentrate" identifies the solids content of the plasma component of bovine blood which is produced when bovine blood is treated to prevent its coagulation, physically processed to mechanically separate the red blood components and provide a fluid called plasma which is dried to remove volatiles and thereby isolate the solid portion of the plasma.

Bovine protein concentrate is known to be an excellent binder for meat emulsions and it is also a highly nutritious material so that its addition to a meat emulsion is desirable from many standpoints. Unfortunately, it is such a good binder that, when it is used in excessive amount, it permits an unscrupulous meat packer to incorporate excessive proportions of water and fat in the meat emulsion without having such excess become evident to all by the separation of such excess water and fat from the emulsion. The protein of the concentrate and the citrates normally used to prevent coagulation of bovine blood are both common components of meat emulsions, so that the concentration of bovine protein concentrate in a meat emulsion cannot be readily determined. Moreover, even if one were to find and employ a tracer addition in the concentrate, there would be no feasible way to insure its presence since it could be added at any time (or withheld whenever a lapse of inspection permitted).

To avoid the possibility of deceptive practices as noted above, the use of bovine protein concentrate in meat emulsions is prohibited in federally inspected meat packing plants, despite the obvious desirability of permitting its use.

In accordance with the present development, ethylenediamine tetraaacetic acid in the form of its disodium salt is added to freshly drawn bovine blood and is used in precisely controlled and preferably minimal quantities necessary to prevent the blood from coagulating. The ethylenediamine tetraacetic acid anti-coagulant is used as a tracer in the invention. As a result of the use of an anticoagulant tracer in constant (and especially minimal) quantities, it becomes possible to provide a system in which the presence of excess bovine protein concentrate can be detected and, at the same time, the utilization of the tracer component in its required minimal amount is insured by the fact that the bovine blood will coagulate if the tracer is not used and if no other anti-coagulant is present. The presence of other anti-coagulants is easily detectable in the concentrate prior to its incorporation in a spice mixture, flavoring agent or meat emulsion and the absence of other anticoagulants is easily insured by spot checking and by the necessary presence of inspection during the slaughtering operation and since the coagulants must be added when the blood is drawn and their selection cannot be altered during storage.

It is particularly pointed out that the effective utilization of disodium ethylenediamine tetraacetic acid as a tracer in accordance with the present development requires the presence of several factors used in combination.

First, the ethylenediamine tetraacetic acid must be used in precisely controlled proportion, and especially in minimal proportion so that the required amount of the tracer substance is necessarily present in the bovine protein concentrate unless some other anti-coagulant is used—and this is easily detected by occasional checks. In this connection, the usual anti-coagulants are citrates and the addition of citrates is easily detected.

The bovine protein concentrate is incorporated in meat emulsions in an amount of only a few ounces per 100 pounds of meat and the quantity of disodium ethylenediamine tetraacetic acid required to prevent the coagulation of bovine blood is small. Accordingly, it is necessary to provide an accurate measure of the quantity of ethylenediamine tetraacetic acid present in a meat emulsion when such agent is present in an amount of only a few parts per million. Accurate test procedures for the detection of ethylenediamine tetraacetic acid in such small amounts have been developed as part of the investigation which led to the present development.

In the conventional collection of bovine blood, there is no opportunity to control the amount of anti-coagulant and, since bovine blood coagulates rapidly, e.g., within a few minutes, it is always necessary to employ proportions of anti-coagulant which are well above minimal amounts. Accordingly, bovine blood as it is presently available contains an anti-coagulant in unpredictable and excessive proportions. Even if the anti-coagulant in the conventional product were selected to be disodium ethylenediamine tetraacetic acid, as in the invention, the fact that the proportion thereof would be uncontrollable and excessive would prevent its effective utilization in accordance with the invention. Also in many conventional collection procedures, the bovine blood is grossly contaminated whereas, for incorporation in a meat emulsion, it is essential that the bovine blood be collected in the absence of contamination and procedures for this purpose constitute a part of the present invention.

In the present invention disodium ethylenediamine tetraacetic acid is employed in a regular predetermined amount of the order of 0.1%±0.02%, and is most preferably maintained at a minimal quantity, e.g., in the range of from 0.08-.10% by weight, based on the weight of the blood.

It is pointed out that ethylenediamine tetraacetic acid appears to function by tying up the calcium ion content of the blood which is necessary to coagulation and this, in turn, appears to be substantially a constant so that there is little significant variation from animal to animal of the minimal concentration of anti-coagulant which is needed to prevent the coagulation function.

Since, in accordance with preferred practice, as little of the disodium ethylenediamine tetraacetic acid is used as is consistent with the prevention of coagulation, then the mere existence of the plasma in the absence of other anti-coagulants, such as citrates, establishes the presence of at least the minimum proportion of the tracer component in accordance with the invention. If one were to employ an excessive proportion this would give a false and excessive reading on analysis, automatically insuring against the careless incorporation of the tracer component.

As one aspect of the present development, the bovine blood is collected in a manner requiring individual handling so that the bovine blood of each steer is collected individually in a prefixed amount in an individual container containing a specific amount of the disodium ethylenediamine tetraacetic acid. While this individual handling increases the cost of collection, it enables the blood to be collected without contamination and it also permits accurate control of the proportion of disodium ethylenediamine tetraacetic acid. In this connection, the bovine protein concentrate of the invention is prepared from bovine blood which is free of extraneous contaminants, though such contaminants are normally present when bovine blood is collected by simply severing the head of the steer from the body followed by drainage of the carcass and collection of the blood in a trough together with stomach and other fluids which are present therein.

The individual sanitary collection procedure outlined above and described in greater detail hereinafter not only permits the use of controlled proportions of disodium ethylenediamine tetraacetic acid, but it also permits the use of minimal amounts, for unless such an accurate collection system is used, an excessive proportion of anticoagulant must be employed in order to insure the presence of enough to prevent coagulation.

The individual santitary collection procedure incorporates an animal ticketing control method used in conjunction with routine inspection by inspectors of the Meat Inspection Division of the United States Department of Agriculture to preclude the use of blood from diseased animals. Thus, if an animal proved to be diseased, the blood drawn therefrom can be identified, and this blood and all equipment contacting the same can be appropriately dealt with. All equipment must be maintained in an appropriate hygienic condition and the blood must be drawn directly from the animal without intermingling with the visceral contents of the animal and without contacting the hide of the animal.

The disodium salt of ethylenediamine tetraactic acid is selected because of the well known unusual tolerance of the human body for this particular salt. On the other hand, it is stressed that the invention employs only trace amounts of ethylenediamine tetraacetic acid in the meat emulsion providing maximum certainty that frequent intake of this particular agent will be tolerated by the human body without harm.

The presence of ethylenediamine tetraacetic acid can be determined by a simple and highly accurate test which has been developed. In this test or assay method, reliance is had upon the extremely powerful capacity of ethylenediamine tetraacetic acid to keep one equivalent of nickel ion in solution despite the capacity of dimethyl glyoxime to precipitate nickel ion which is not so solubilized. Accordingly, if one simply adds an excess of a soluble nickel salt and then precipitates nickel with an excess of dimethyl glyoxime the filtrate will contain only that amount of nickel ion which has been solubilized by ethylenediamine tetraacetic acid. This filtrate can be removed, digested with sulfuric acid, and then tested for nickel.

Also, and as a matter of interest, ethylenediamine tetraacetic acid is not easily removed from the bovine protein concentrate since it is extremely resistant to precipitation and this further insures the absence of deceptive practice.

Accordingly, the use of mere routine checking will insure the presence of minimal proportions of the tracer component in the plasma which is distributed and used in spice mixtures and meat emulsions and the final meat emulsion can be assayed to insure that excessive proportions of the concentrate have not been used since the use of such an excess would immediately show up by virtue of the fact that this would automatically introduce an excessive proportion of ethylenediamine tetraacetic acid which, despite its presence in just a few parts per million, can be detected and accurately assayed.

Referring more particularly to the meat emulsions which are formed in accordance with the invention, there are various types of meat emulsions, sausage being particularly representative of this class of materials. On the other hand, knockwurst, weiners or frankfurters, bologna, salami, and the like will further illustrate the class of meat emulsions. The term "emulsion" indicates that the various components such as meat, water, fat, etc., are so extensively intermingled as to form an essentially homogeneous system. Binders are added for the purpose of improving and maintaining the homogeneity of the emulsion.

The meat emulsion, in accordance with the invention is preferably modified to include from 1–4 ounces of the bovine protein concentrate per 100 pounds of the meat emulsion, though as little as ½ ounce is frequently sufficient for effective binding action. While the bovine protein concentrate may constitute the only binding agent present in the meat emulsion this is not necessarily the case since other binders may also be present to exert their usual function. Of course, and in contrast with ordinary binders, the binder of the invention is a meat product as opposed to farinaceous, milk-derived products, or phosphates.

In order to collect the blood in accordance with the invention, the neck of the steer is opened to permit the sanitary siphoning of the blood from the jugular vein and the blood is collected by a sanitary siphoning instrument introduced into an opening in the throat of the animal with the blood being pumped by the animal's heart and drained directly into a sanitary receptacle. In this way, only a portion of the blood normally obtained can be withdrawn from a given animal and if one wishes to obtain the balance of the blood this can be done by draining the carcass into a trough in the usual manner, but such additional blood is not used in the present invention. The blood pumped directly from the animal is deposited in a container containing a predetermined proportion of disodium ethylenediamine tetraacetic acid so that, by the direct combination of a given quantity of the blood from the animal with a given quantity of anticoagulant in the collection pail, an exact balance is obtained between the amount of anti-coagulant and the amount of blood, and the blood is collected directly and without contamination so that no treatment of the blood is required, such as the introduction of germicides.

Large amounts of water tend to hydrolyze blood destroying its capacity to be used in the production of plasma. Accordingly, and in accordance with the invention, water is largely excluded so as to avoid hydrolyzing the blood which is centrifuged for the extraction of the plasma component.

After the blood has been collected with the precise proportion of disodium ethylenediamine tetraacetic acid as the sole anti-coagulant, the blood is centrifuged and clarified in the usual manner and with due regard for aseptic conditions to provide the plasma component thereof. This plasma component is spray dried in order to provide the product in a concentrated and stable powder form. This powder may contain up to about 1.8% water.

The bovine protein concentrate can be incorporated in the meat emulsion in any desired fashion, normally as a powder dispersed in a flavoring agent or in a spice mixture. The bovine protein concentrate can also be included in the meat emulsion by first dissolving it, or a soluble flavoring agent such as dextrose containing the same, in a dilute salt solution, e.g., an approximately 1% solution of salt (NaCl) in water.

The invention is illustrated in the examples which follow:

EXAMPLE I

Freshly drawn bovine blood siphoned directly from the jugular vein of a steer is deposited in a container and therein combined with substantially 0.09 part by weight of disodium ethylenediamine tetraacetic acid per 100 parts by weight of blood. The product is centrifuged and clarified to separate liquid plasma containing 8% solids. The lquid plasma at 40° F. is spray dried in a tower to an extremely fine powder using stainless steel equipment. Air is supplied to the tower at 550–575° F. and leaves the tower at 185° F. The spray dried product is of very fine particle size (less than 200 mesh) and contains 1.5% by weight of water.

The product is stable at room temperature for long periods of time and contains approximately 50% by weight albumin and 19% fibrinogen. It has a digestable rating of 95% to 100% and is free of pathogenic and saprophytic organisms as determined by periodic testing in conventional fashion (the powder is emulsified in distilled water and a culture is grown in a broth and examined microscopically).

EXAMPLE II

The present example is intended to demonstrate, on a comparative basis, the effectiveness of the bovine protein concentrate as a binder for frankfurters.

Frankfurter meat formula—sub-standard grade

This formula was standard through the five identified hereinafter:

| | | |
|---|---|---|
| Beef—95% lean | pounds | 25 |
| Pork—20% lean | do | 37.5 |
| Ice | do | 37.5 |
| Seasoning | ounces | 12 |
| Salt | do | 16 |
| Prague powder | do | 6 |
| Erythorbic acid | ounce | ¾ |

The following binders were used per 100 pounds of meat formula:

A–1—½ ounce bovine protein concentrate of Example I
A–2—1 ounce bovine protein concentrate of Example I
A–3—2 ounces commercial polyphosphate binder
A–4—3½ pounds spray dried milk powder
A–5—3½ pounds spray dried milk powder, which included 1 ounce bovine protein concentrate of Example I.

All lots were processed on an equal basis in every respect including a cooking treatment at 154° F.

Observations and findings

General.—None of the emulsions failed—that is, none had grease-caps or water pockets—even though this was a difficult test because of the low meat content and the high amounts of fat and water.

Specific.—#A–5 was by all odds the best of the lot—it had the tightest emulsion, excellent texture and refused to ooze any fat or moisture either by scraping or squeezing.

A–2 was next best, not quite as firm as #A–5, but in all other respects equal—a good tight emulsion and excellent texture.

A–4 was next best to #A–2. Both were good tight emulsions, but the texture and color of #A–2 were somewhat superior.

A–1 and #A–3 gave equal results so far as tightness of emulsion is concerned. Scraping and/or squeezing caused some oozing, but neither of them would release enough to drip. Further, #A–1 had a decided color advantage over #A–3. #A–3 tended to a darker emulsion in the chop, and a greyish appearance in the finished product. This situation remained unchanged during sliced exposure to air and light. Neither #A–1 nor #A–3 had the "snap" which is characteristic of a good-eating frank. All of the others did, with #A–5 being best.

As a matter of interest, and using ½ ounce bovine protein concentrate per hundred weight, one gets as good an emulsion and as fine a texture as with 2 ounces of commercial polyphosphate binder per hundred weight, but better color in the chopper and in the end product.

The combination of bovine protein concentrate with any other protein binder, such as milk, improves the performance of both. Other proteins which perform well in combination with bovine protein concentrate are illustrated by toasted soy protein.

While all five products were edible, #A–1 and #A–3 would not make good commercial products (too limp); but the other three would be acceptable in commerce and would be marked in the order heretofore noted based on their appearance.

Repeating the same series of tests, but using equal amounts of the same grades of beef and pork provides essentially the same superiority noted with the exception that all of the products were improved due to the incrrease in meat and decrease in fat.

EXAMPLE III

Illustrative spice mixtures for use in the preparation of sausage and frankfurters in an amount of about 14 ounces per 100 pounds of meat formula are as follows:

Spice mixture for sausage 4 ounces ground white pepper
1½ ounces ground Rumanian coriander
¾ ounce ground mustard seed (yellow)
⅛ ounce ground decorticated cardamom
⅛ ounce ground ginger
5 ounces dextrose containing:
    2.1 grams oleoresin nutmeg
    0.7 gram nutmeg oil
    0.4 gram pimenta leaf oil
2 ounces bovine protein concentrate of Example I Spice mixture for frankfurters 4 ounces ground white pepper
1½ ounces ground Rumanian coriander
¾ ounce ground mustard
⅛ ounce ground ginger
⅛ ounce ground cardamom
4 ounces dextrose containing:
    2.1 grams oleoresin nutmeg
    0.7 gram nutmeg oil
    0.4 gram oil of pimenta leaf
2 ounces bovine protein concentrate of Example I These spice mixtures are preferably blended into the meat component of the sausage or frankfurter before the other components are added. Desirably, the components heavy in fat are the last to be blended in.

EXAMPLE IV 7 ounces of soya protein flour and 1 ounce of the bovine protein concentrate of Example I are mixed with 100 pounds of ground ham ends rich in fat. In the absence of the bovine protein concentrate, patties made from the mixture tend to fall apart when grilled and turned over and to lose excessive fat in frying. The presence of the bovine protein concentrate eliminates these difficulties.

A determination of the proportion of bovine protein concentrate in any meat emulsion can now be easily effected since such proportion is now directly related to the proportion of disodium ethylenediamine tetraacetic acid anti-coagulant present. A suitable assay is illustrated in the following example:

EXAMPLE V (1) Homogenize 30–40 grams of the meat emulsion in a Waring Blendor with 75 milliliters of hexane. Decant the hexane and repeat the extraction to remove the fat. After discarding the hexane solutions, homogenize the remaining solids with 70 milliliters of water, blending for two minutes.

(2) Transfer the homogenate quantitatively to a centrifuge bottle and spin down the solids for 10 minutes. Filter the supernatant liquid through glass wool, washing the solids in the centrifuge bottle with two small portions of water. Discard the residue and refilter the combined solution through a Buchner funnel containing Whatman No. 42 paper.

(3) Collect the filtrate in a 150 milliliter volumetric flask or graduated cylinder, and bring to the 150 milliliter mark with washing. Based on the expected level of disodium ethylenediamine tetraacetic acid anti-coagulant in the original emulsion, select an aliquot of the solution containing 20 to 40 micrograms of anti-coagulant.

Caution: It is important to have the filtrate as clear as possible before the reaction is carried out. If the sample solution is to be stored for more than one hour before proceeding further, it should be refiltered.

(4) Transfer the necessary quantity of filtrate to a 30 milliliters beaker and add sufficient water to make 10 milliliters. Add 0.2 milliliter of 1.33 percent nickel sulphate ($NiSO_4 \cdot 6H_2O$) and allow the mixture to stand for 10 minutes. Make the solution alkaline, to a pH 9–10, with dilute ammonium hydroxide, and add 0.5 milliliter of a 1.5 percent ethanolic solution of dimethylglyoxime.

(5) Immediately heat to boiling to agglomerate the nickel chelate and filter through Whatman No. 42 filter paper, with washing, into a 100 milliliters Kjeldahl flask. Digest the filtrate to destroy organic matter by adding three drops of concentrated sulfuric acid and cautiously heating. When the mixture fumes, cool and add three drops of 30 percent hydrogen peroxide. Continue the digestion, repeating the addition of peroxide until the solution is clear.

(6) Cool and transfer, with washing, to a 100 milliliters beaker. Adjust to pH 7.0 with a pH meter, using the following consecutive dilutions of ammonium hydroxide; concentrated, 1 milliliter of concentrated to 50 milliliters, 1 milliliter of the latter to 100 milliliters. Transfer the solution to a 25 milliliters stoppered graduated cylinder and add 0.5 milliliter of saturated bromine water. Allow to stand for 30 minutes.

(7) Add four drops of concentrated ammonium hydroxide, mix, and then add 0.5 milliliter of the alcoholic 1.5 percent dimethylglyoxime. Mix thoroughly and read the absorbance at 430 m$\mu$ in 5 centimeter cells, using a reagent blank carried through the entire digestion procedure.

(8) Construct a calibration curve by adding 20, 50, 80 and 100 micrograms of disodium ethylenediamine tetraacetic acid to 30 milliliters beakers, bringing to 10 milliliters volume with water, and continuing the entire procedure through the precipitation, digestion and color reaction beginning with step 4. The level of ethylenediamine tetraacetic acid present in the meat emulsion is estimated from the calibration curve and calculated based on the aliquot taken in step 3, and the sample size used. The results can be expressed in terms of disodium ethylenediamine tetraacetic acid, or can be calculated in routine fashion to any other desired form such as ounces of bovine protein concentrate per 100 pounds of meat emulsion as desired. Typical calibration points are as follows:

| Concentration of disodium ethylenediamine tetraacetic acid per aliquot in mg.: | Absorbance at 430 m$\mu$ in 5 centimeter cells |
|---|---|
| 20 | 0.098 |
| 50 | 0.288 |
| 80 | 0.478 |
| 100 | 0.595 |

This analysis procedure is described and claimed in copending application Ser. No. 414,021 filed Nov. 25, 1964 in the name of Robert D. Kross and assigned to the same assignee as the present application now Patent No. 3,386,806.

As a matter of interest, the production of disodium ethylene diamine tetraacetic acid in the bovine protein concentrate can be determined as is illustrated in the following example.

EXAMPLE VI (1) Disperse 50 milligrams of the bovine protein concentrate in 100 milliliters of water, filter a portion through Whatman No. 42 filter paper, and pipet a 2 milliliters aliquot into a 30 milliliter beaker. Add 8 milliliters of water and continue the analysis beginning with step 4 in the previous example. Compare with a calibration curve constructed in the same manner, and calculate ethylenediamine tetraacetic acid content as before.

The invention is defined in the claims which follow.

I claim:

1. In the use of bovine protein material in a meat emulsion, the improvement which permits the detection of the proportion of said protein material in said meat emulsion which improvement comprises adding to whole bovine blood a predetermined amount, of the order of 0.08 to 0.12% based on the total weight of said whole blood, of a tracer material consisting of disodium ethylenediamine tetraacetic acid, and thereafter incorporating the plasma component derived from said whole blood in said meat emulsion, said plasma component being in dried form, to permit the quantitative analysis of the concentration of said tracer material in said meat emulsion.

2. The method according to claim 1 wherein said plasma component is prepared from bovine blood which is free of extraneous contaminants.

3. A meat emulsion as produced by the method in claim 1.

4. A tracer composition suitable for use in determining the proportion of a bovine protein concentrate incorporated in a meat emulsion, said tracer composition consisting of said bovine protein concentrate and a tracer material, wherein said concentrate comprises the dried plasma component of whole bovine blood, and said tracer material consists of a predetermined amount of disodium ethylenediamine tetraacetic acid added to said whole blood in an amount of the order of 0.08 to 0.12 percent by weight of said whole blood.

5. A bovine protein concentrate suitable for use in determining the proportion of said concentrate in a meat emulsion, said bovine protein concentrate comprising the spray-dried plasma component of whole bovine blood, said blood having added thereto a predetermined amount of the order of 0.08 to 0.10 percent by weight of a tracer material consisting of disodium ethylenediamine tetraacetic acid, based on the weight of said whole blood, said tracer material also being the sole anticoagulant added to said blood.

References Cited

UNITED STATES PATENTS

| 1,804,042 | 5/1931 | Wescott | 99—21 |
| 2,241,868 | 5/1941 | Reimann | 99—109 |
| 3,073,700 | 1/1963 | Ziegler | 99—21 |

OTHER REFERENCES

Rose et al.: "The Condensed Chemical Dictionary," 1956, 5th edition, published by Reinhold Publishing Corp., New York, page 456, article entitled Ethylene Diaminetetraacetic Acid.

HYMAN LORD, *Primary Examiner.*

U.S. Cl. X.R.

99—21, 109